(12) United States Patent
Ferrier

(10) Patent No.: US 12,492,007 B2
(45) Date of Patent: Dec. 9, 2025

(54) SYSTEM FOR ESTABLISHING A PRIMARY FUNCTION DISPLAY IN AN ELECTRICAL VERTICAL TAKEOFF AND LANDING AIRCRAFT

(71) Applicant: BETA AIR, LLC, South Burlington, VT (US)

(72) Inventor: Lochie Ferrier, Burlington, VT (US)

(73) Assignee: BETA AIR LLC, South Burlington, VT (US)

( * ) Notice: Subject to any disclaimer, the term of this patent is extended or adjusted under 35 U.S.C. 154(b) by 0 days.

(21) Appl. No.: 18/773,379

(22) Filed: Jul. 15, 2024

(65) Prior Publication Data
US 2025/0007306 A1 Jan. 2, 2025

Related U.S. Application Data

(63) Continuation of application No. 18/221,553, filed on Jul. 13, 2023, which is a continuation of application
(Continued)

(51) Int. Cl.
| | |
|---|---|
| B64D 43/00 | (2006.01) |
| B60L 58/12 | (2019.01) |
| B64C 29/00 | (2006.01) |
| B64D 27/34 | (2024.01) |
| B64D 27/357 | (2024.01) |
| H02J 7/00 | (2006.01) |
| B64U 101/30 | (2023.01) |

(52) U.S. Cl.
CPC ............. *B64D 43/00* (2013.01); *B60L 58/12* (2019.02); *B64C 29/0033* (2013.01); *B64D 27/34* (2024.01); *B64D 27/357* (2024.01); *H02J 7/0048* (2020.01); *B60L 2200/10* (2013.01);
(Continued)

(58) Field of Classification Search
CPC ...... B64D 43/00; B64D 27/34; B64D 27/357; B60L 58/12; B60L 2200/10; H02J 7/00; H02J 7/0048; H02J 2310/44; B64C 29/00; B64C 29/0033; B64U 2301/30; H01M 2220/20
See application file for complete search history.

(56) References Cited

U.S. PATENT DOCUMENTS

| 8,698,653 B2 | 4/2014 | Rogers |
| 9,530,322 B2 | 12/2016 | Caudron |

(Continued)

FOREIGN PATENT DOCUMENTS

WO WO2023/136918 A1 7/2023

OTHER PUBLICATIONS

Howard, "Honeywell Aerospace cockpit avionics brings safety features, situational awareness to Pilatus PC-24"; May 22, 2013; 4 pages. Available at <https://www.militaryaerospace.com/commercial-aerospace/article/14226986/honeywell-aerospace-cockpit-avionics-brings-safety-features-situational-awareness-to-pilatus-pc-24>.
(Continued)

*Primary Examiner* — Robert L Deberadinis
(74) *Attorney, Agent, or Firm* — Lee & Hayes, P.C.

(57) ABSTRACT

A system for establishing a primary function display for an electrical vertical takeoff and landing aircraft. The system further includes a plurality of sensors that detects at least a metric and generates at least a datum based on the at least a metric. Specifically, state of charge is at least generated based on the performance metric of an energy source. The system further includes a display to show the at least a datum. The system further includes a controller that receives the at least a datum and generates a visual to the pilot.

20 Claims, 12 Drawing Sheets

Related U.S. Application Data

No. 17/953,634, filed on Sep. 27, 2022, now Pat. No. 12,040,648, which is a continuation of application No. 17/575,066, filed on Jan. 13, 2022, now Pat. No. 11,509,154.

(52) U.S. Cl.
CPC ..... *B64U 2101/30* (2023.01); *H01M 2220/20* (2013.01); *H02J 2310/44* (2020.01)

(56) References Cited

U.S. PATENT DOCUMENTS

| | | |
|---|---|---|
| 9,567,106 B2 | 2/2017 | Thuong |
| 10,392,126 B2 | 8/2019 | Louviot |
| 11,509,154 B1 | 11/2022 | Ferrier |
| 11,742,679 B2 | 8/2023 | Ferrier |
| 12,040,648 B2 | 7/2024 | Ferrier |
| 2003/0151381 A1 | 8/2003 | Kadota |
| 2010/0049396 A1 | 2/2010 | Ferro |
| 2016/0318622 A1 | 11/2016 | Haukom |
| 2017/0003684 A1 | 1/2017 | Knudsen |
| 2017/0032576 A1 | 2/2017 | Mazoyer |
| 2017/0113810 A1 | 4/2017 | Saptharishi |
| 2020/0241565 A1 | 7/2020 | Bosworth |
| 2020/0264010 A1 | 8/2020 | Hewitt |
| 2020/0277080 A1 | 9/2020 | Wiegman |

OTHER PUBLICATIONS

Patent Cooperation Treaty: International Search Report and Written Opinion for PCT/US2022/053646 dated Apr. 7, 2023; 10 pages.

US 12,492,007 B2

SYSTEM FOR ESTABLISHING A PRIMARY FUNCTION DISPLAY IN AN ELECTRICAL VERTICAL TAKEOFF AND LANDING AIRCRAFT

CROSS-REFERENCE TO RELATED APPLICATIONS

This application is a continuation of Non-provisional application Ser. No. 17/953,634 filed on Sep. 27, 2022 and entitled "SYSTEM FOR ESTABLISHING A PRIMARY FUNCTION DISPLAY IN AN ELECTRICAL VERTICAL TAKEOFF AND LANDING AIRCRAFT," which claims the benefit of priority to Non-provisional application Ser. No. 17/575,066 filed on Jan. 13, 2022 and entitled "SYSTEM FOR ESTABLISHING A PRIMARY FUNCTION DISPLAY IN AN ELECTRICAL VERTICAL TAKEOFF AND LANDING AIRCRAFT," both of which are incorporated herein by reference in their entirety.

FIELD OF THE INVENTION

The present invention generally relates to the field of electrical aircrafts. In particular, the present invention is directed to a system for establishing a primary function display in an electrical vertical takeoff and landing aircraft (eVTOL).

BACKGROUND

Electric vertical takeoff and landing aircrafts are quickly becoming an important form of transportation. However, existing pilot interfaces do not adequately fulfill the needs of pilots.

SUMMARY OF THE DISCLOSURE

In an aspect, a system for establishing a primary function display for an electrical vertical takeoff and landing (eVTOL) aircraft, the system including an electric aircraft, wherein the electric aircraft includes an electric motor and a cockpit, wherein the cockpit includes a display configured to display at least a datum. The system further including a plurality of sensors onboard the electric aircraft, the plurality of sensors configured to detect at least a status datum, wherein the at least a status datum is associated with the electric motor. The system further including a controller configured to receive the at least a status datum and generate a visual output at the display based on the at least a status datum.

In another aspect, a method for a primary function display for an electrical vertical takeoff and landing (eVTOL) aircraft, the method including detecting, at a plurality of sensors located onboard an electric aircraft, at least a status datum, wherein the at least a status datum is associated with an electric motor. The method further including receiving, at a controller, the at least a status datum. The method further includes generating, at the controller, a visual output at a display based on the at least a status datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a primary function display in an electrical vertical takeoff and landing aircraft (eVTOL) and methods for its use and/or implementation. In an embodiment, aspects of the present disclosure may be incorporated into a cockpit of an electric aircraft. Aspects of the present disclosure may be used to detect metrics and generate data based on such metrics. Aspects of the present disclosure may also be used to display a datum. A controller may be configured to receive a datum and generate a visual output based on a datum and/or metric.

Figure 1:
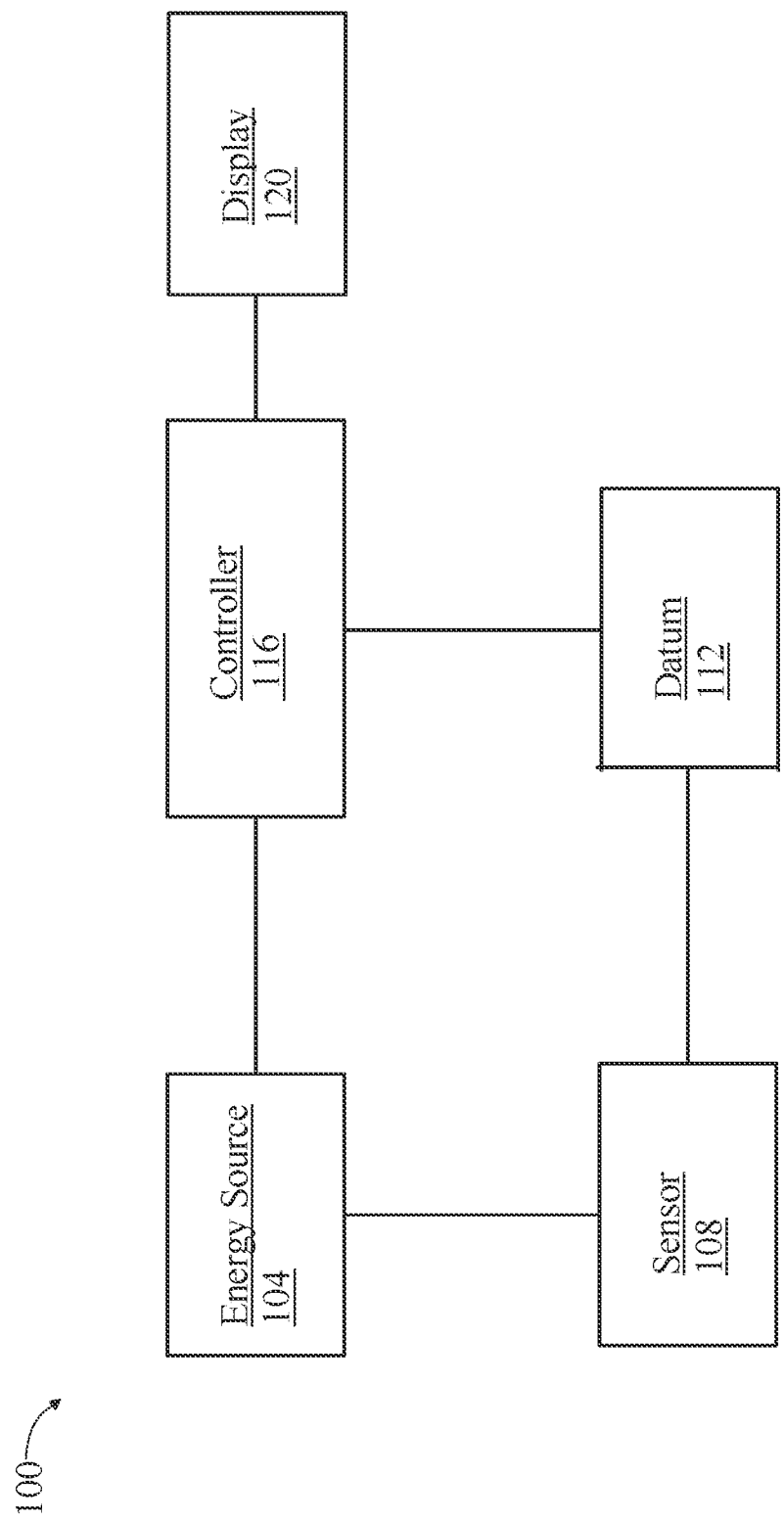
FIG. 1 is a block diagram illustrating a system for establishing a primary function display in an eVTOL.

Referring now to FIG. 1, an exemplary embodiment of a primary function display 100 for an electrical vertical takeoff and landing (eVTOL) aircraft is illustrated. As used herein, a vertical take-off and landing (eVTOL) aircraft is one that can hover, take off, and land vertically. An eVTOL, as used herein, is an electrically powered aircraft typically using an energy source 104, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate lift caused by the aircraft's forward airspeed and the shape of the wings and/or foils, such as airplane-style flight.

As used in this disclosure a "propulsor component" or "propulsor" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

In another embodiment, and still referring to FIG. 1, propulsor may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

Still referring to FIG. 1, propulsor may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

Further referring to FIG. 1, primary function display 100 includes plurality of sensors onboard the electric aircraft. As used in this disclosure, a "sensor" is a device, module, and/or subsystem, utilizing any hardware, software, and/or any combination thereof to sense a characteristic, a phenomenon, and/or changes thereof, in an instant environment, for instance without limitation a flight component which the sensor 108 is proximal to or otherwise in a sensed communication with, and transmit information associated with the characteristic, for instance without limitation digitized data. Plurality of sensors may be configured to include a temperature sensor, pressure sensor, torque sensor, revolutions per minute (RPM) sensor, geospatial sensor, or the like. Geospatial sensor may include light detection and ranging (LIDAR), global positioning system (GPS), optical scanning, and the like. As used in this disclosure, "torque" is the rotational equivalent of linear force. It is also referred to as the moment, moment of force, rotational force or turning effect, depending on the field of study. The concept originated with the studies by Archimedes of the usage of levers. Just as a linear force is a push or a pull, a torque can be thought of as a twist to an object around a specific axis. Another definition of torque is the product of the magnitude of the force and the perpendicular distance of the line of action of a force from the axis of rotation. In three dimensions, the torque is a pseudovector; for point particles, it is given by the cross product of the position vector (distance vector) and the force vector. The magnitude of torque of a rigid body depends on three quantities: the force applied, the lever arm vector connecting the point about which the torque is being measured to the point of force application, and the angle between the force and lever arm vectors. Available torque may be determined, without limitation, as illustrated in U.S. patent application Ser. No. 17/186,079, filed on Feb. 26, 2021, and entitled "Methods and System for Estimating Percentage Torque Produced by a Propulsor Configured for Use in an Electric Aircraft", the entirety of which is incorporated by reference in this disclosure.

With continued reference to FIG. 1, sensor 108 may generate a torque datum 112. An "torque datum", for the purposes of this disclosure, is an element of data that represents a physical value, electrical value, or combination thereof. In a non-limiting embodiment, sensor 108 may detect the torque produced by propulsor and translate that torque value into an electrical signal that represents that value for use in later processing or steps consistent with the entirety of this disclosure.

The plurality of sensors may include a sensor suite. For example, sensor suite may include a plurality of sensor arrays where each sensor array includes a plurality of sensors detecting the same physical phenomenon. Independent sensors may include separate sensors measuring physical or electrical quantities that may be powered by and/or in communication with circuits independently, where each may signal sensor output to a control circuit such as a user graphical interface.

With continued reference to FIG. 1, the primary function display may be configured to detect at least a metric. As used in this disclosure, a "metric" refers to a measurement captured by the plurality of sensors. At least a metric includes an performance metric of an energy source 104. As used in this disclosure, a "performance metric" is a measurable value describing how an aircraft is operating. In an embodiment, performance metric may include parameters such as state of charge, state of health, useful energy remaining, and the like. Electrical parameters are discussed in further detail below. As used in this disclosure, an "electrical parameter" is a measurable electrical value or phenomenon that characterize the behavior of electronic circuits, components, or semiconductors. Electrical parameters may include, without limitation, potential, current, and/or impedance of a flight component. As used herein, "energy source" is configured to power at least a portion of an electric vehicle and can include, without limitation, a cell. Energy source 104 may include, without limitation, a generator, a photovoltaic device, a battery cell, a fuel cell such as a hydrogen fuel cell, direct methanol fuel cell, and/or solid oxide fuel cell, or an electric energy storage device; electric energy storage device may include without limitation a capacitor and/or a battery. A person of skill in the art will appreciate that energy source 104 may be designed as to meet the energy or power requirement of various electric vehicles. A person of ordinary skill in the art will further appreciate that energy source 104 can be designed to fit within a designated footprint on the various electric aircrafts. In some embodiments, the primary function display 100 may be configured to generate at least a datum 112 based on the at least a metric, wherein the at least a datum 112 includes a state of charge based on the performance metric. For the purposes of this disclosure, "state of charge" is the level of charge of an electric battery relative to its capacity. The units of SoC may be percentage points (0%=empty; 100%=full). An alternative form of the same measure is the depth of discharge (DoD), the inverse of SoC (100%=empty; 0%=full). SoC is normally used when discussing the current state of a battery in use, while DoD is may be often seen when discussing the lifetime of the battery after repeated use. In an EVTOL, for example, SoC for the battery module 104 may be the equivalent of a fuel gauge in a gasoline powered vehicle. At least a metric may be configured to determine a battery temperature, a stator temperature, an orientation of the eVTOL relative to any suitable reference frame or point, including ground, gravity vector, etc., a position of the eVTOL, a velocity of the eVTOL, and the like. As used in this disclosure, "orientation" is a datum 112 describing an attitude and spatial position of the aircraft relative to any suitable reference frame or point. For example, orientation may include, without limitation, data describing attitude, pitch, yaw, and/or roll. Computing device may generate a state of health datum based off of a performance metric. For the purposes of this disclosure, "state of health" is a figure of merit of the condition of a battery (or a cell, or a battery pack), compared to its ideal conditions. The units of SoH are percent points (100%=the battery's conditions match the battery's specifications). Typically, a battery's SoH will be 100% at the time of manufacture and will decrease over time and use. However, a battery's performance at the time of manufacture may not meet its specifications, in which case its initial SoH will be less than 100%. Additionally or alternatively, computing device may generate a useful energy remaining datum based off of a performance metric. A "useful energy remaining datum," for the purpose of this disclosure, is a datum describing a quantity of energy remaining in the battery. In one embodiment, the useful energy remaining datum may be generated as a function of a machine learning process. In one embodiment, computing device 116 is further configured to utilize neural networks to generate the useful energy remaining datum.

With continued reference to FIG. 1, the primary function display 100 includes a display 120. As used in this disclosure, "display" refers any suitable image-generating device for the visual representation of at least a datum 112. In a nonlimiting example, image-generating device may include augmented reality device, various analog devices (e.g., cathode-ray tube, etc.), and digital devices (e.g., liquid crystal, active-matrix plasma, etc.). An "augmented reality" device, as used in this disclosure, is a device that permits a user to view a typical field of vision of the user and superimposes virtual images on the field of vision. Augmented reality device may be implemented in any suitable way, including without limitation incorporation of or in a head mounted display 120, a head-up display 120, a display 120 incorporated in eyeglasses, googles, headsets, helmet display 120 systems, or the like, a display 120 incorporated in contact lenses, an eye tap display 120 system including without limitation a laser eye tap device, VRD, or the like.

Figure 2:
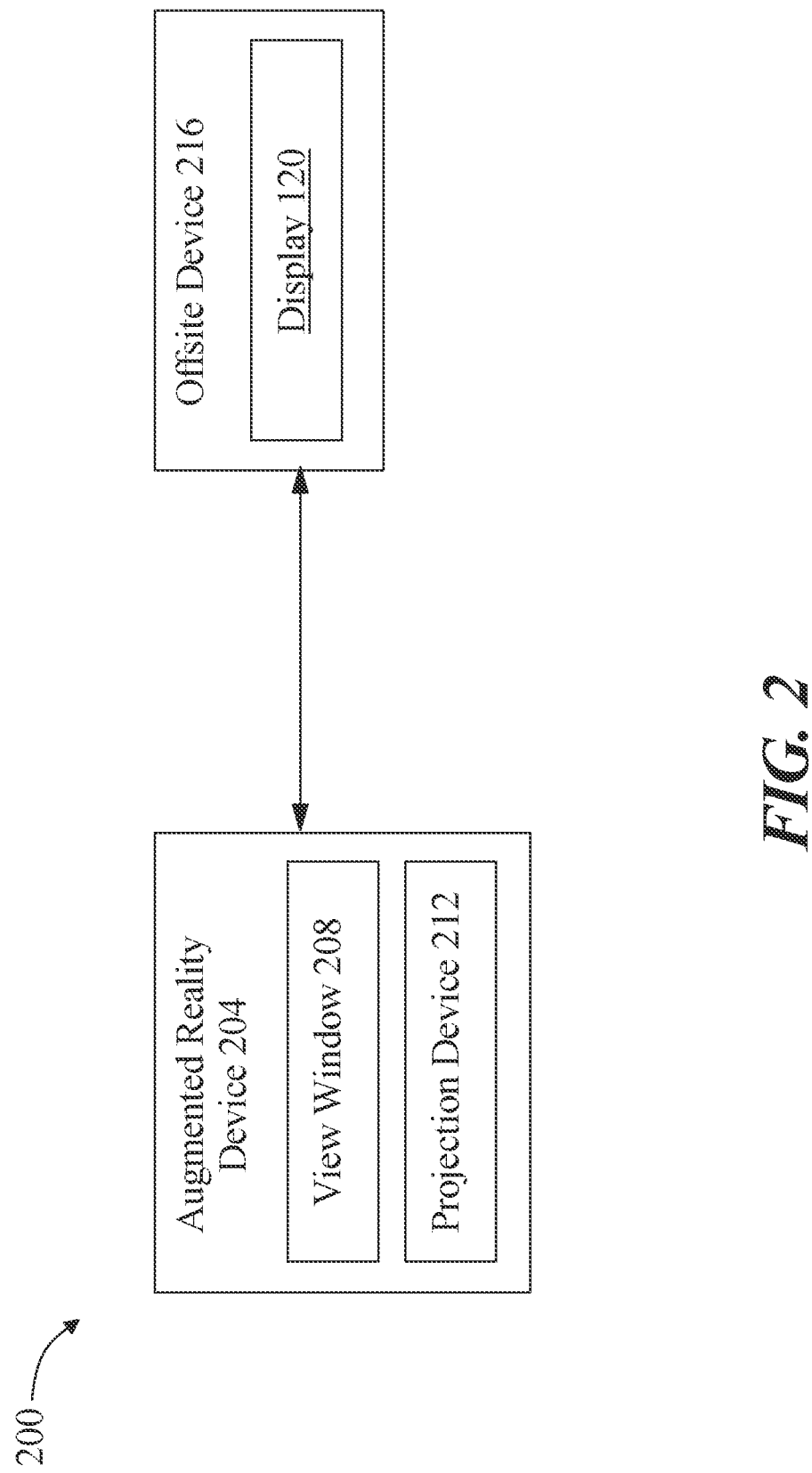
FIG. 2 is a block diagram of an augmented reality device according to an embodiment of the invention.

Referring now to FIG. 2, an exemplary embodiment of a system 200 for remote augmented reality communication for a flight display is illustrated. System may include an augmented reality device 204. An "augmented reality" device, as used in this disclosure, is a device that permits a user to view a typical field of vision of the user and superimposes virtual images on the field of vision. Augmented reality device 204 may include a view window 208, defined for the purposes of this disclosure as a portion of the augmented reality device 204 that admits a view of field of vision; view window 208 may include a transparent window, such as a transparent portion of goggles such as lenses or the like. Alternatively, view window 208 may include a screen that displays field of vision to user. Augmented reality device 204 may include a projection device 212, defined as a device that inserts images into field of vision. Where view window 208 is a screen, projection device 212 may include a software and/or hardware component that adds inserted images into a display 120 signal to be rendered on the display 120. Projection device 212 and/or view window 208 may make use of reflective waveguides, diffractive waveguides, or the like to transmit, project, and/or display 120 images. For instance, and without limitation, projection device 212 and/or display 120 may project images through and/or reflect images off an eyeglass-like structure and/or lens piece, where either both field of vision and images from projection device 212 may be so displayed, or the former may be permitted to pass through a transparent surface. Projection device 212 and/or view window 208 may be incorporated in a contact lens or eye tap device, which may introduce images into light entering an eye to cause display 120 of such images. Projection device 212 and/or view window 208 may display 120 some images using a virtual retina display 120 (VRD), which may display 120 an image directly on a retina of pilot.

Continuing to refer to FIG. 2, augmented reality device 204 may include a field camera 216. A "field camera," as used in this disclosure, is an optical device, or combination of optical devices, configured to capture field of vision as an electrical signal, to form a digital image. Field camera 216 may include a single camera and/or two or more cameras used to capture field of vision; for instance, and without limitation, the two or more cameras may capture two or more perspectives for use in stereoscopic and/or three-dimensional display 120, as described above. Field camera 216 may capture a feed including a plurality of frames, such as without limitation a video feed.

Still referring to FIG. 2, augmented reality device 204 may be implemented in any suitable way, including without limitation incorporation of or in a head mounted display 120, a head-up display (HUD) 120, a display 120 incorporated in eyeglasses, googles, headsets, helmet display 120 systems, or the like, a display 120 incorporated in contact lenses, an eye tap display 120 system including without limitation a laser eye tap device, VRD, or the like. Augmented reality device may alternatively or additionally be implemented using a projector. Persons skilled in the art, upon reviewing the entirety of this disclosure, will be aware of various optical projection and/or display 120 technologies that may be incorporated in augmented reality device 204 consistently with this disclosure.

Referring again to FIG. 1, the primary function display 100 includes a controller 116. In some embodiments, controller 116 may be configured to receive the at least a datum 112. System includes a controller 116. Controller 116 may include any computing device as described in this disclosure, including without limitation a microcontroller, microprocessor, digital signal processor (DSP) and/or system on a chip (SoC) as described in this disclosure. Controller 116 may include, be included in, and/or communicate with a mobile device such as a mobile telephone or smartphone. Controller 116 may include a single computing device operating independently, or may include two or more computing device operating in concert, in parallel, sequentially or the like; two or more computing devices may be included together in a single computing device or in two or more computing devices. Controller 116 may interface or communicate with one or more additional devices as described below in further detail via a network interface device. Network interface device may be utilized for connecting controller 116 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 116 may include but is not limited to, for example, a computing device or cluster of computing devices in a first location and a second computing device or cluster of computing devices in a second location. Controller 116 may include one or more computing devices dedicated to data storage, security, distribution of traffic for load balancing, and the like. Controller 116 may distribute one or more computing tasks as described below across a plurality of computing devices of computing device, which may operate in parallel, in series, redundantly, or in any other manner used for distribution of tasks or memory between computing devices. Controller 116 may be implemented using a "shared nothing" architecture in which data is cached at the worker, in an embodiment, this may enable scalability of system 100 and/or computing device.

With continued reference to FIG. 1, controller 116 may be designed and/or configured to perform any method, method step, or sequence of method steps in any embodiment described in this disclosure, in any order and with any degree of repetition. For instance, controller 116 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 116 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, primary function display 100 may be configured to display the at least a datum 112. Also, the primary function display 100 may be configured to generate a visual output at the display 120 based on the at least a datum 112, wherein the visual output includes the state of charge. The display 120 may be configured to select different a default visual output of a plurality of visual output candidates. For instance, without limitation, visual output candidates could be based on a current phase of flight, a current flight maneuver, one or more sensor 108 inputs, and the like. Visual output may be overridden by a pilot. Default visual output may be set by a user, during manufacturing, or the like. Alternatively or additionally, visual output may be configured by a machine learning process to choose a default display 120. A "machine learning process," as used in this disclosure, is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language. The display 120 may be configured to show an alert to the pilot. As used in this disclosure, "alert" refers to a signal indicating an abnormal event. The abnormal event may include any external factors including weather, turbulence, other flying objects, etc. The alert may be configured to include a physical feedback alert, and the like. A "physical feedback," for the purpose of this disclosure, is an electronically generated simulation of physical senses. In a non-limiting example, physical feedback may include vibrations, sounds, visual alerts, and the like thereof.

Figure 3:
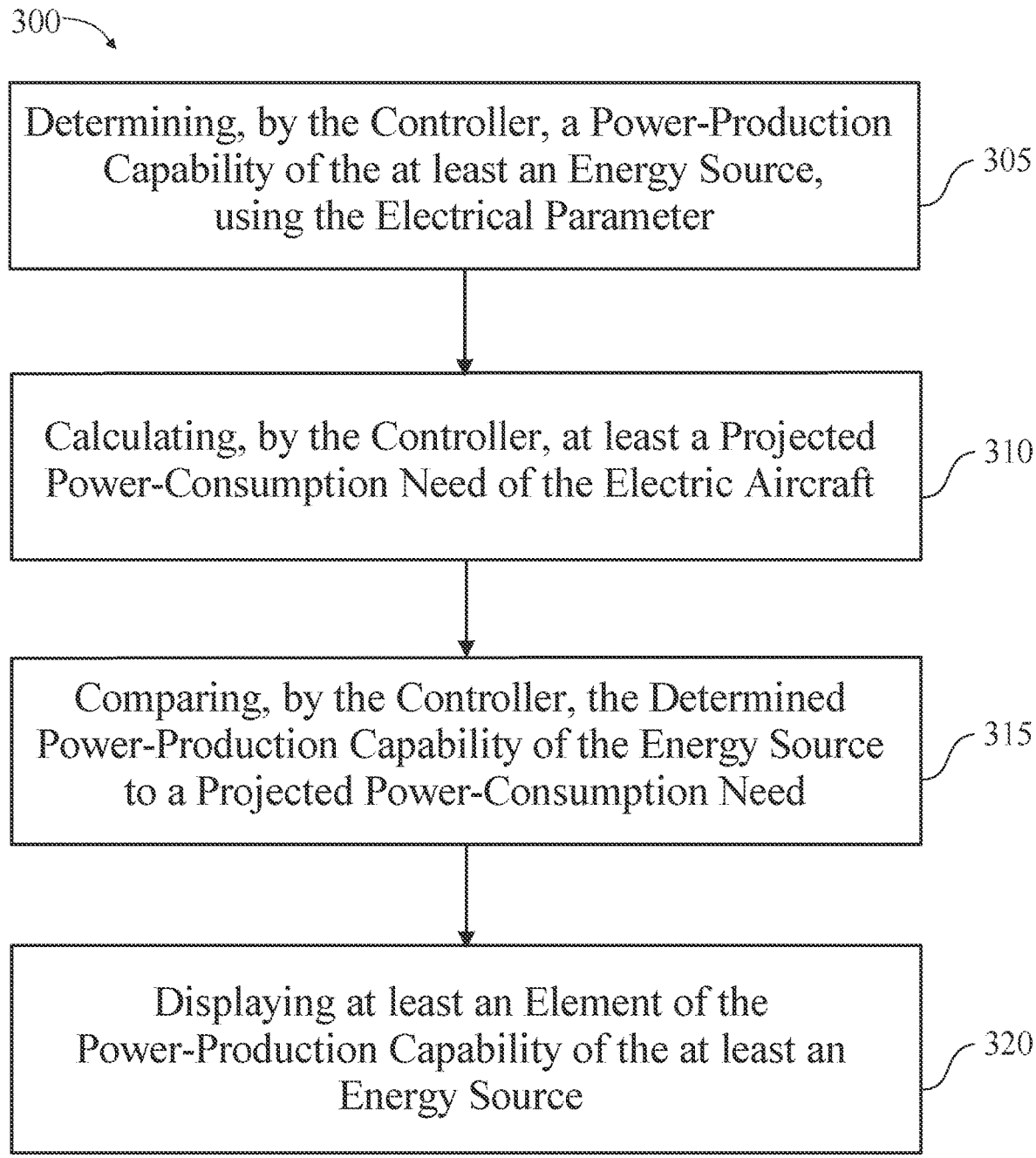
FIG. 3 is a flow chart of an exemplary embodiment of a method for displaying state of charge

Referring now to FIG. 3, an exemplary embodiment of a method 300 for displaying state of charge is illustrated. At step 305, Controller 116 determines a power-production capability of the energy source 104. The power-production capability is determines using the electrical parameter. As used herein, a power-production capability is a capability to deliver power and/or energy to a load or component powered by an electrical energy source. In an embodiment, state of voltage (SOV) may be used instead of or in addition to state of charge to determine a current state and power-production capability of an energy source 104. State of voltage may be determined based on open-circuit voltage. Open circuit voltage may, as a non-limiting example, be estimated using voltage across terminals, for instance by subtracting a product of current and resistance, as detected and/or calculated using detected or sampled values, to determine open-circuit voltage. As a non-limiting example, instantaneous current and voltage may be sampled and/or detected to determine Delta V and Delta I, representing instantaneous changes to voltage and current, which may be used in turn to estimate instantaneous resistance. Low-pass filtering may be used, as a non-limiting example, to determine instantaneous resistance more closely resembling a steady-state output resistance of an energy source 104 than from transient effects, either for discharge or recharge resistance. Open-circuit voltage may, in turn be used to estimate depth of discharge (DOD) and/or SOC, for instance by reference to a data sheet graph or other mapping relating open circuit voltage to DOD and/or SOC. Remaining charge in an energy source 104 may alternatively or additionally be estimated by one or more other methods including without limitation current integrator estimate of charge remaining.

Figure 4:
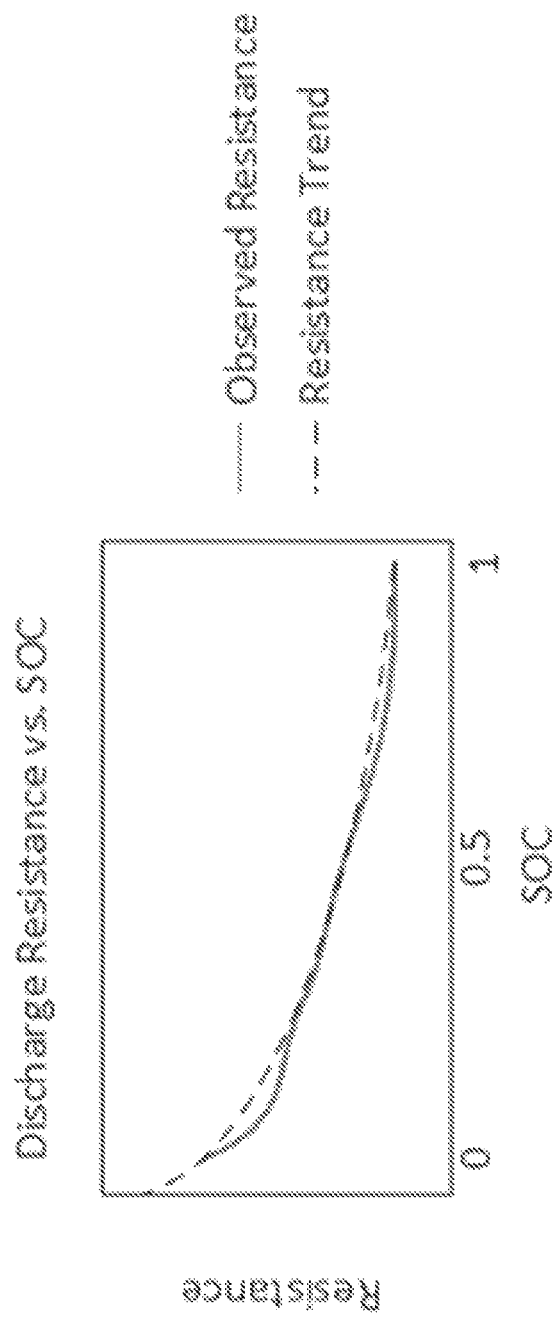
FIG. 4 is a graph illustrating an exemplary embodiment of open circuit voltage and derivative with respect to state of charge of open circuit voltage, plotted against state of charge.

Still referring to FIG. 3, SOV and/or open circuit voltage of an energy source 104 and/or one or more cells or components thereof may be used to determine power-production capability in an embodiment. Discharging a battery to the minimum allowed cell potential may give maximum discharge power. This may be a function of a cell's open circuit potential and series resistance, as determined for instance using the following equation:

$$P\text{cell·max discharge} = (V\text{oc} - V\text{cell·min}) * V\text{cell·min} / \text{Cell·resistance·discharge}$$

where Voc is open circuit voltage, Vcell·min is the minimum allowed open circuit potential, and cell·resistance·discharge is a cell's discharge resistance, which may be calculated in an embodiment as described above. One or more additional calculations may be used to aid in determination of likely future behavior of an electrical energy source 104. For instance, a derivative of open circuit voltage with respect to SOC may be calculated and/or plotted; FIG. 4 is a graph illustrating open circuit voltage and the derivative of open circuit voltage with respect to SOC, as plotted against SOC. Alternatively or additionally, a derivative of resistance with respect to SOC may be tracked.

In an embodiment, and still referring to FIG. 3, determining power-production capability may further include determining a state of charge (SOC) of an energy source 104. Determining the power-production capability may include comparing an electrical parameter to a curve representing a projected evolution over time of an energy source 104. In an embodiment and without limitation, SOC vs time may be used to determine the power and energy outputs of the energy source 104 and may represent the available battery capacity. In an embodiment and without limitation, an energy source consists of a plurality of battery cells. SOC may be impacted by the chemistry type and footprint which can affect the charge and discharge rates and the operational range over time. SOC may also be impacted by any component of the system including wiring, conduit, housing, or any other hardware which may cause resistance during use. Cycle life of an energy source 104 will also be affected by the number of charge and discharge cycles completed in operation. Capability of an energy source 104 to store energy may decrease after several iterations of the charge/discharge cycle over its lifetime.

Still referring to FIG. 3, determination of power-production capability may further include modifying a curve as a function of the electrical parameter; for instance, determining may include modifying an SOC curve as a function of the electrical parameter. As an energy source 104 is being used, the available capacity output may be reduced which can be detected as a change in voltage over time. Projected data curves for the power output delivery based on the calculations may be recalculated. As described above, the SOC of an energy source 104 may degrade after each flight and charge and discharge cycle. The new curves generated will be used to determine future power output delivery capabilities. Any or all steps of the method may be repeated in any order. For example, the SOC of an energy source 104 may be calculated more than one time during a flight in order to accurately ensure an energy source 104 has the power output capacity for the landing method and location, as described in further detail below. In an embodiment, controller 116 may compare one or more sampled values of an electrical parameter to curve; where values tend to be more than a threshold amount off of the projected curve, controller 116 may replace that curve with another one representing, for instance, an SOC curve for an energy source 104 that is more aged, and thus has a higher output resistance, for an energy source 104 having a higher temperature resulting in a higher output resistance, or the like.

Referring again to FIG. 3, an energy source 104 may include a plurality of energy source 104s connected in series. For instance, energy source 104 may include a set of batteries and/or cells connected in series to achieve a particular voltage, or the like. Determining power-production capability of an energy source 104 may include determining a plurality of component energy capabilities representing the energy capabilities of each energy source 104 of the plurality of energy source 104s, identifying a lowest component energy capability of the plurality of component energy capabilities, and determining the delivery capability of the energy source 104 as a function of the lowest component energy capability. For instance, and without limitation, one cell or battery connected in series with another cell or battery may have a lower SOC, or otherwise be able to produce less total energy and/or power than the other battery or cell; as a result, an energy source 104 overall may be limited primarily by the cell or battery with lower SOC, making the effective power-production capability overall dependent on the power-production capability of the cell or battery with the lowest SOC.

Still referring to FIG. 3, in an embodiment, an SOC of an energy source 104 can be calculated with datum 112 obtained from sensor 108, or a plurality of sensors during flight. Datum 112 may be calculated using estimation methods used to estimate the SOC. Datum 112 may include, without limitation, voltage, current, resistance, impedance, and/or temperature of an energy source 104. These estimations may include, without limitation, coulomb counting, open circuit voltage, impedance, or other models. Estimations may also use lookup tables or equivalent data structures which may be obtained from technical specifications, such as datasheets, describing the energy source 104 behavior under, without limitation, load, and environmental conditions. Alternatively or additionally, one or more mathematical relations may be used to determine current SOC while in flight. Persons skilled in the art will be aware, upon reviewing the entirety of this disclosure, will be aware of various combinations of methods used to determine SOC.

With continued reference to FIG. 3, at step 310, controller 116 calculates a projected power-consumption need of the electric aircraft. A projected power-consumption need may be calculated as a function of a flight plan for the electric aircraft. As used herein, a "power-consumption need" includes an energy and/or power need of a component or system, including any component that consumes power, any set of two or more components that consume power, and/or any system that consumes power, including without limitation plurality of propulsors, electric aircraft, and/or components thereof.

In an embodiment and continuing to refer to FIG. 3, calculating a projected power-consumption need may include determining a projected power-consumption need of a remaining portion of the flight plan. A projected power-consumption need for performing a given flight plan may be stored in memory accessible to controller 116. Flight plan may include, without limitation, the geospatial location of the landing site, the calculated distance to the landing site, the time required to reach the landing site, the landing methods. As an example and without limitation, controller 116 may store in its memory projected power-consumption needed to perform a scheduled landing according to a landing protocol called for in flight plan, a likely energy cost of traveling a particular distance while cruising, and the like. Stored energy costs may include one or more dependencies on conditions of flight. For example and without limitation, energy needed to travel a certain distance through the air may depend on speed and direction of wind, air density, degree of turbulence, exterior temperature, or the like. In an embodiment, calculating further includes determining a current state of electric aircraft with respect to flight plan. Determination of current state may include identifying a current location of electronic aircraft. Current location of electric aircraft 300 may be determined using elapsed time of flight, geographical position as calculated by GPS or similar systems, information about current position as received from other parties such as air traffic controllers, and/or optical, radar, or Lidar data identifying landmarks or other geographic features outside electronic aircraft. Calculation may include identifying a remaining portion of flight plan as a function of current state.

Still referring to FIG. 3, calculation of a projected power-consumption need may be performed using data from an environmental sensor 108. In an embodiment, calculating the projected power-consumption need further includes receiving a sensor datum 112 from an environmental sensor 108. Calculating the projected power-consumption need may further include calculating the projected power-consumption need as a function of a sensor datum 112. Receiving a sensor datum 112 may include, as a non-limiting example, receiving an external temperature. Projected power-consumption needs may, for example and without limitation, increase at high external temperatures owing to less efficient performance of components at high temperatures generally. Similarly, a high external temperature may cause controller 116 to predict that one or more components' temperatures are likely to increase during the flight, causing the one or more components to use energy less efficiently, and increasing the energy needed to perform steps of flight plan. The sensor datum 112 may include, for example and without limitation, a temperature of a component of the electronic aircraft; as noted above, one or more components may perform less efficiently at higher temperatures, or at lower temperatures. Sensor datum 112 may include a degree of turbulence, which may be detected using, for instance, motion data collected using an IMU or the like. A higher degree of turbulence may be used, as a non-limiting example, by controller 116 to predict greater energy consumption needs. Persons skilled in the art, upon reviewing the entirety of this disclosure, will be aware of various external sensor 108 data that may be used to predict a projected power-consumption need as used herein.

Continuing to refer to FIG. 3, at step 315, controller 116 may determine whether power-production capability is sufficient for a projected power-consumption need. In an embodiment, controller 116 may create a first number representing power-production capability of an electrical source and a second number representing a projected power-consumption need of electrically powered aircraft and compare the two numbers; controller 116 may maintain a buffer number by which power-production capability must exceed a projected power-consumption need. Controller 116 may, for example and without limitation, determine that power-production capability is sufficient for projected power-consumption need if the two numbers are equal. As a further example and without limitation, controller 116 may determine that power-production capability is sufficient for a projected power-consumption need if power-production capability exceeds a projected power-consumption need by buffer number. As another non-limiting example, controller 116 may perform this calculation using lookup tables or mathematical relations as described above. For instance and without limitation, controller 116 may retrieve from a lookup table a potential level necessary to drive a propulsor at a given velocity. The controller 116 may, without limitation, perform a calculation based on the demands described above which determines a rate of power consumption based on the demand by the propulsors at a given time in flight. This power consumption rate may be used to determine if the power demand of propulsors needed to arrive at the originally selected location using the originally selected landing method is possible given the current energy source 104 capacity.

Still referring to FIG. 3, controller 116 may determine that the power-production capability is not sufficient for the projected power-consumption needs and modifying the flight plan as a function of the power-production capability. In an embodiment, if the calculated energy need for the first flight plan is not sufficient, controller 116 may analyze a number of options for a second flight plan which will optimize the remaining energy capacity of an energy source 104. Second flight plan may include a different location based on distance but maintain the original landing protocol. For instance and without limitation, flight plan may include a first landing protocol, and modifying the flight plan further comprises replacing the first landing protocol with a second landing protocol. For example and without limitation, the first landing protocol may be a hovering landing, the second landing protocol is an airplane landing and/or runway-based landing. The landing protocol may include, as a non-limiting example, a vertical landing sequence which further comprises an aerodynamic stall of a wing-based flight followed by a rotor-based flight landing. The landing protocol may include, as a further non-limiting example, a runway approach landing sequence similar to a fixed wing landing protocol. In an electric aircraft, an energy source 104 must have enough capacity to power the aircraft and satisfy the load demand of the plurality of propulsors to execute a safe and accurate landing. In a non-limiting example, if the projected power-consumption need of the first flight plan exceeds the remaining capacity of the energy source 104 at a given time during flight, a second landing protocol may be chosen by the controller 116. As an example and without limitation, analysis and computation may alternately or additionally be performed by a remote device and transmitted to controller 116. Second flight plan may include, without limitation, a different landing protocol at the same location as the first flight plan. Second flight plan may further include, without limitation, both a different landing protocol and landing location. Second flight plan may involve, as an example and without limitation, using the same landing protocol at a different landing location.

Still referring to FIG. 3, at step 320, a display 120 displays at least an element of the power-production capability of the energy source 104. The display 120 may be any display as described above in reference to FIGS. 1-2. At least an element of the power-production capability includes any power-production capability as described above in reference to FIGS. 1-2. The element of the power-production capability may include, for example and without limitation, the remaining time able to use rotor-based flight based on the energy source 104.

Referring now to FIG. 4, a graph illustrating open circuit voltage and the discharge resistance with respect to SOC, as plotted against SOC is illustrated. Energy source 104 capable of delivering may, without limitation, be calculated using a SOC vs time curve. Calculation may include, as a non-limiting example, plotting points on SOC vs. time curve to determine a point along the curve an energy source 104, a component cell, and/or other portion thereof has arrived. Determining a point along the curve may enable controller 116 to predict future potential power output by reference to remainder of curve. For a particular energy source 104, the design may dictate safe operation SOC conditions as indicated in figures below. As an example and without limitation, a safety reserve, such as a gas tank reserve, may also be designated based on the design characteristics and manufacturing data; such as operating range may by enforced by the controller 116, energy source 104 may only operate in the designated operating range, and a safety reserve may only be used in cases where a critical functions demand power in order to ensure a safe flight.

Figure 5A:
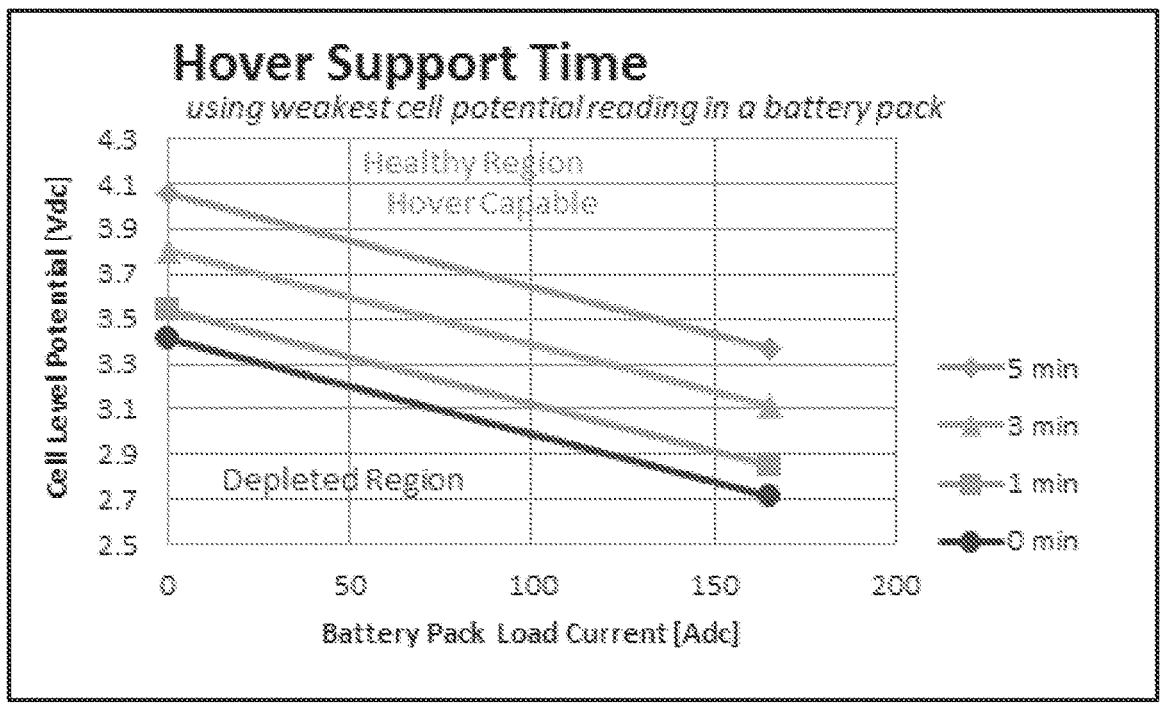
FIGS. 5A-B are graphs illustrating exemplary embodiments of hover time plotted as a function of current versus terminal voltage.
Figure 5B:
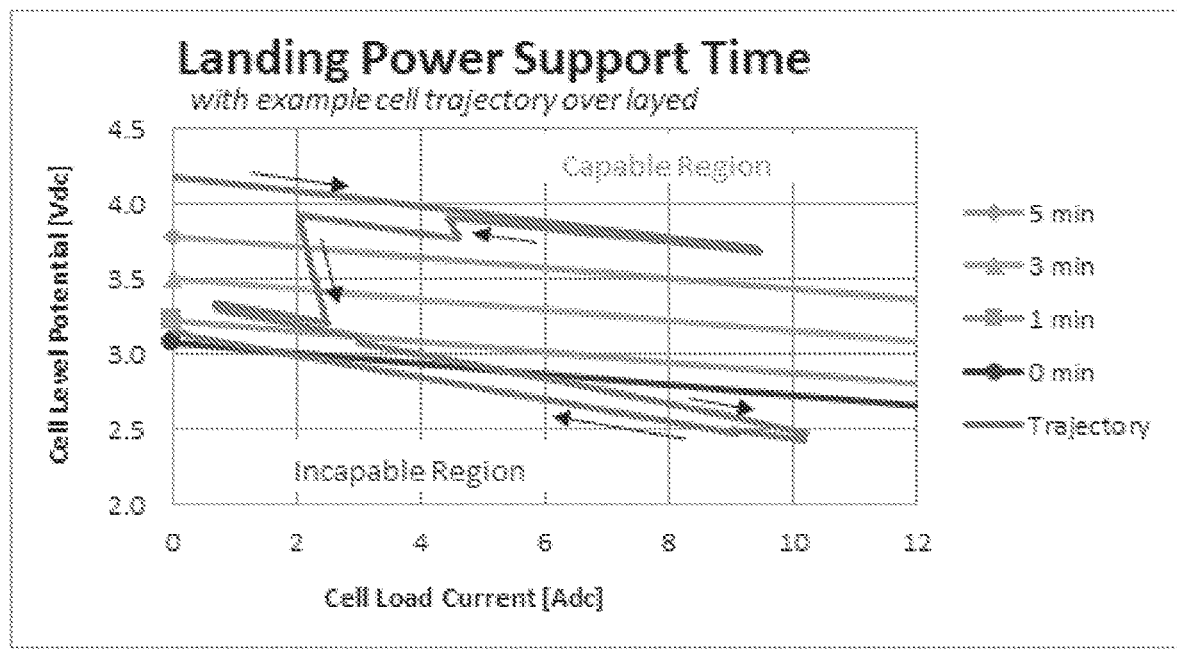

Referring now to FIGS. 5A and 5B, power-production capability may be calculated or provided with respect to one or more flight maneuvers. As a non-limiting example, power-production capability may be expressed in terms of hover support time. Hover support time, as described herein, is defined as a period of time for which an energy source 104 is capable of outputting sufficient power to permit electric aircraft to hover. FIG. 5A illustrates how hover support time may be mapped against observed terminal potential and current for a plurality of detected potentials. As an example and without limitation, a potential ranging from 4.1 V to 3.4 V over a current range of 0 to 160 Amps, may correspond to a hover support time of 5 minutes, while a voltage range over the same current range of 3.8 to 3.1 V may correspond to an over time of 3 minutes. Actual behavior of a battery and/or cell may be compared to or plotted over a gradient as represented in FIG. ~A. For instance, shown in FIG. ~B actual behavior of a battery and/or cell may be compared to or plotted over a gradient, where the battery is not able to support the final landing event, as shown by the trajectory line displaying lower than the 0 min line in the incapable region, in this non-limiting example. The trajectory line, as displayed, is a plot of cell voltage versus load current during a flight. The arrows incorporated in FIG. 5B show how the battery behavior is revealed during the flight from inception to the failed attempt at landing. Alternatively or additionally, ability to land and/or perform another flight maneuver may similarly be estimated.

Figure 6:
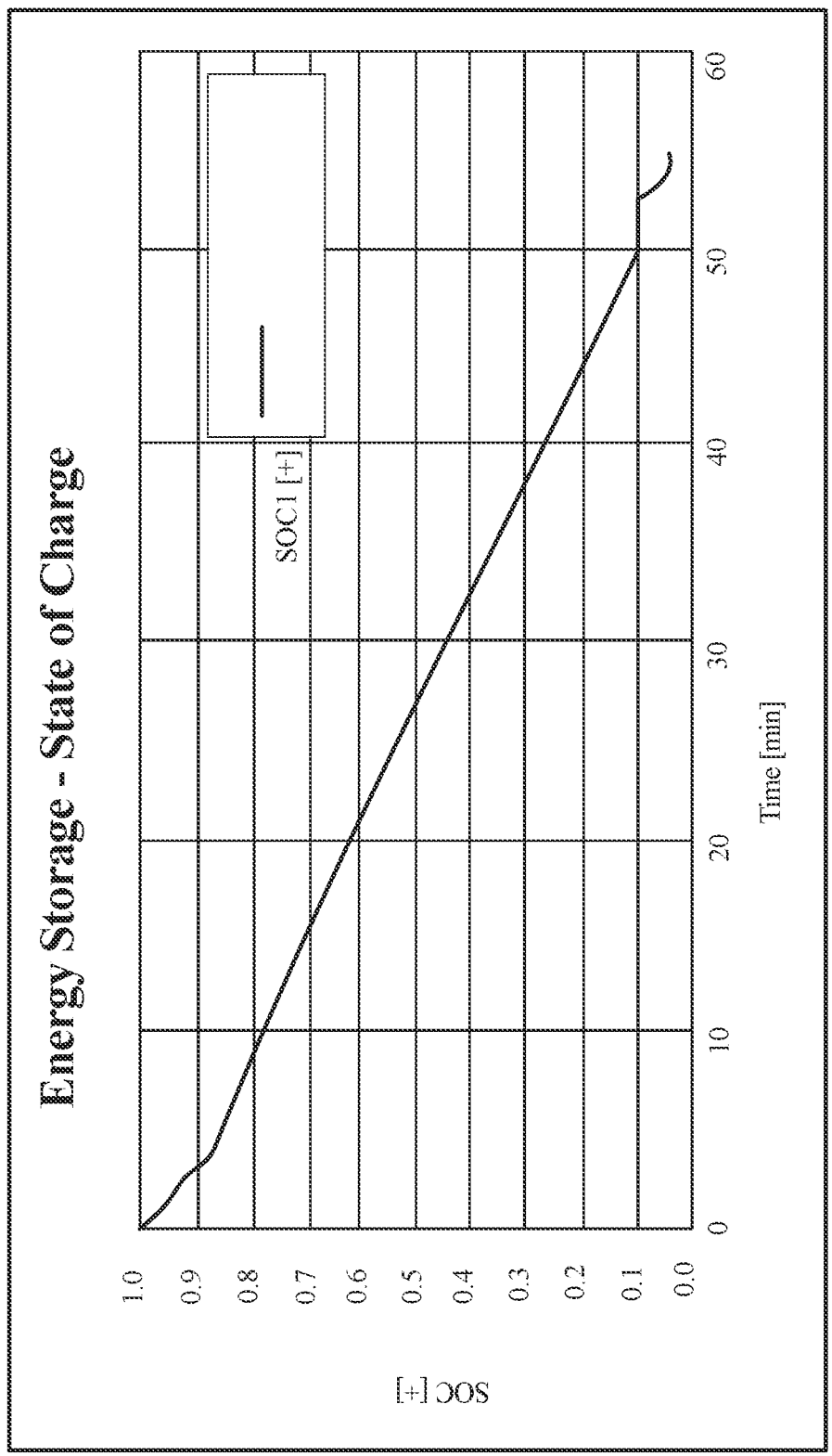
FIG. 6 is a graph showing the state of charge of an energy source as a function of time.

Referring now to FIG. 6, a graph illustrates an SOC of an embodiment of an energy source 104 as a function of time. In an embodiment, determining power-production capability may further include determining a state of charge (SOC) of an energy source 104. Determining the power-production capability may include, without limitation, comparing an electrical parameter to a curve representing a projected evolution over time of an energy source 104.

Still referring to FIG. 6, calculation of power-production capability may further include modifying a curve as a function of the electrical parameter. As an example and without limitation, determining may include modifying an SOC curve as a function of the electrical parameter. As a further example, the energy source 104, is being used the available capacity output may be reduced. The available capacity output may be, without limitation, detected as a change in voltage over time. In an embodiment, projected data curves for the power output delivery based on the calculations may be recalculated. As described above, the SOC of the energy source 104 may degrade after each flight and/or change and discharge cycle. The new curves generated will be used to determine future power output delivery capabilities. Any or all steps of the method may be repeated in any order. For example and without limitation, the SOC of an energy source 104 may be calculated more than one time during a flight in order to accurately ensure the energy source 104 has the power output capacity for the chosen landing method and location, as described in further detail above. In an embodiment and without limitation, controller 116 may compare one or more sampled values of an electrical parameter to curve, wherein values tend to be more than a threshold amount off of the projected curve. For example and without limitation, controller 116 may replace that curve with another one, such as replacing the curve with one representing an SOC curve for the energy source 104 that is more aged, and thus has a higher output resistance, for an energy source 104 having a higher temperature resulting in a higher output resistance, or the like.

Figure 7:
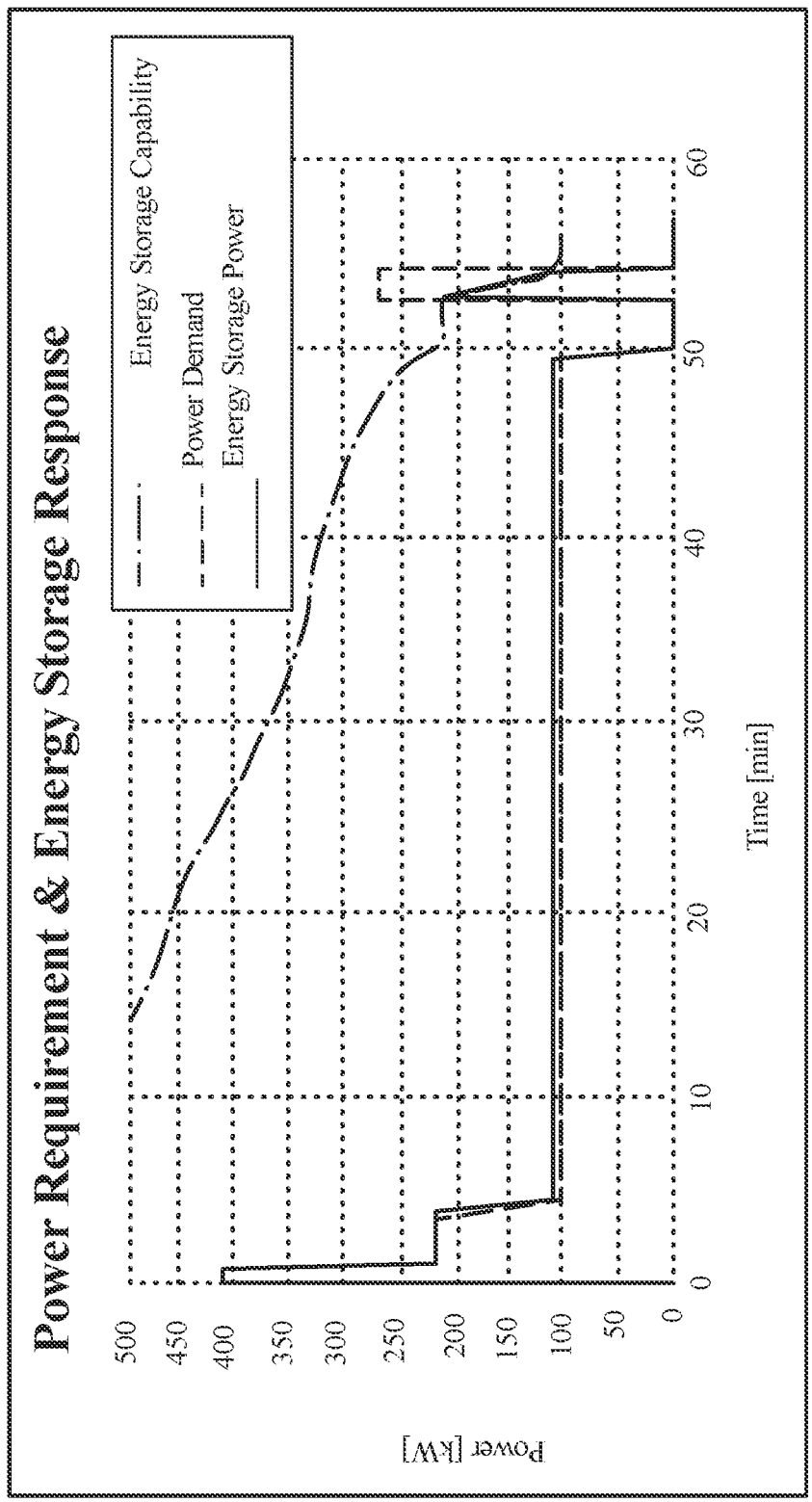
FIG. 7 is a graph showing the power demand of load as a function of time in an exemplary embodiment wherein landing of an electric aircraft is delayed, leaving insufficient power for an intended high power vertical landing.

Referring now to FIG. 7, a graph illustrates the power of the energy source 104 as a function of time. For instance, the graph illustrates a condition where landing of an electric aircraft is delayed. As a result of the delayed landing of an electric aircraft, an energy source 104 is unable to support a power demand for an intended or planned landing. The energy storage capability is a lower power value than the power demanding, which does not allow the electric aircraft to land in the intended format, such as rotor-based flight.

Figure 8A:
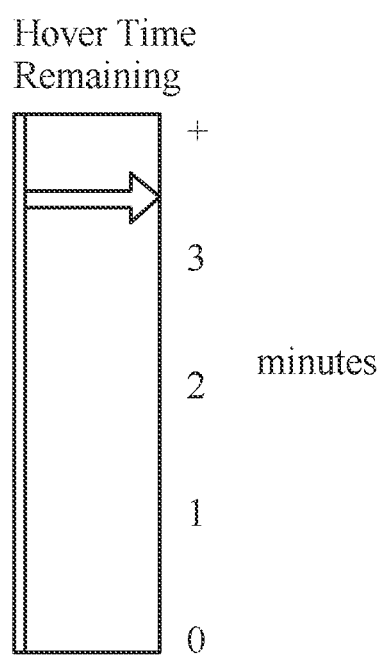
FIG. 8A-B is an exemplary embodiment of a display of an element of the power-production capability by a graphical user interface.
Figure 8B:
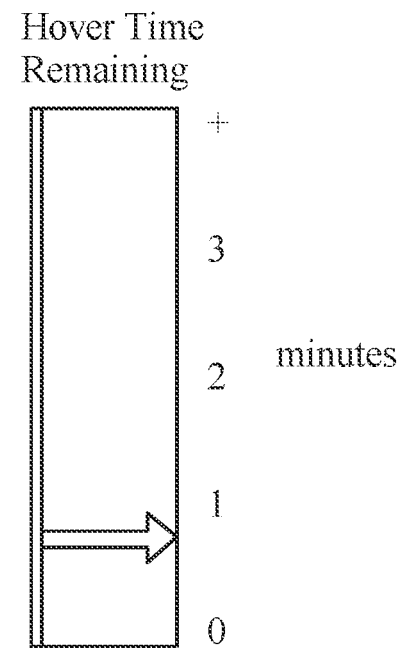

Referring now to FIGS. 8A-8B, an embodiment of the element of the power-production capability of the energy source 104 display 120. At least an element of the power production capability may include any element of the power-production capability. As used herein, a power-production capability is a capability to deliver power and/or energy to a load or component powered by an electrical energy source. A power-production capability may include any power delivery capability as described above in reference to FIGS. 1-7. As an example and without limitation, FIG. 8A illustrates an element of the power production capability of the energy source 104 displayed on the display 120. The power-production capability may be, without limitation, the time remaining in rotor-based flight, such as hover time remaining. Hover time remaining may be, without limitation, displayed in minutes. FIG. 8A illustrates a display of an electric aircraft with a hover time remaining of about three and a half minutes. As a further example and without limitation, FIG. 8B additionally and alternatively illustrates an element of the power production capability of the energy source 104 displayed. The power-production capability may be, without limitation, the time remaining in rotor-based flight, such as hover time remaining. FIG. 8B illustrates a display 120 of an electric aircraft with a hover time remaining of about forty-five seconds.

Now referring back to FIG. 1, sensor 108 may include a sensor configured to detect gas that may be emitted during or after a cell failure. "Cell failure", for the purposes of this disclosure, refers to a malfunction of a battery cell, which may be an electrochemical cell, that renders the cell inoperable for its designed function, namely providing electrical energy to at least a portion of an electric aircraft. Byproducts of cell failure may include gaseous discharge including oxygen, hydrogen, carbon dioxide, methane, carbon monoxide, a combination thereof, or another undisclosed gas, alone or in combination. Further the sensor 108 configured to detect vent gas from electrochemical cells may include a gas detector. For the purposes of this disclosure, a "gas detector" is a device used to detect a gas is present in an area. Gas detectors, and more specifically, the gas sensor that may be used in sensor 108 may be configured to detect combustible, flammable, toxic, oxygen depleted, a combination thereof, or another type of gas alone or in combination. The gas sensor that may be present in sensor 108 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor 108 may include sensors that are configured to detect non-gaseous byproducts of cell failure including, in non-limiting examples, liquid chemical leaks including aqueous alkaline solution, ionomer, molten phosphoric acid, liquid electrolytes with redox shuttle and ionomer, and salt water, among others. Sensor 108 may include sensors that are configured to detect non-gaseous byproducts of cell failure including, in non-limiting examples, electrical anomalies as detected by any of the previous disclosed sensors or components.

With continued reference to FIG. 1, the primary function display 100 may be configured to generate at least a status datum 112 based sensor 108. For the purposes of this disclosure, a "status datum" at least an element of data that represents an operating status of at least a portion of an energy source 104. Status datum 112 may be any one or more elements of data that correspond to the health of at least a portion of battery module, at least a battery cell, at least the motors, and the like. Status datum 112 may be one or more parameters associated with the health, age, electrical characteristics, physical characteristics, calculations derived therefrom, or predictions associated with the energy source 104. Status datum 112 may include one or more elements of data corresponding to failure of at least a battery cell or another portion of the eVTOL. Status datum 112 may include location, type, severity, percentage, or combination of those parameters, among others, of at least a battery cell. Status datum 112 may include a percentage of usable battery module or at least a battery cell that is defective, operational, catastrophically damaged, or overheated consistent with the entirety of this disclosure. Status datum 112 may include more than one signal corresponding to the type of sensor 108 from which is detected. Status datum 112 may be configured to be displayed on the display 120 consistent with this disclosure.

Figure 9:
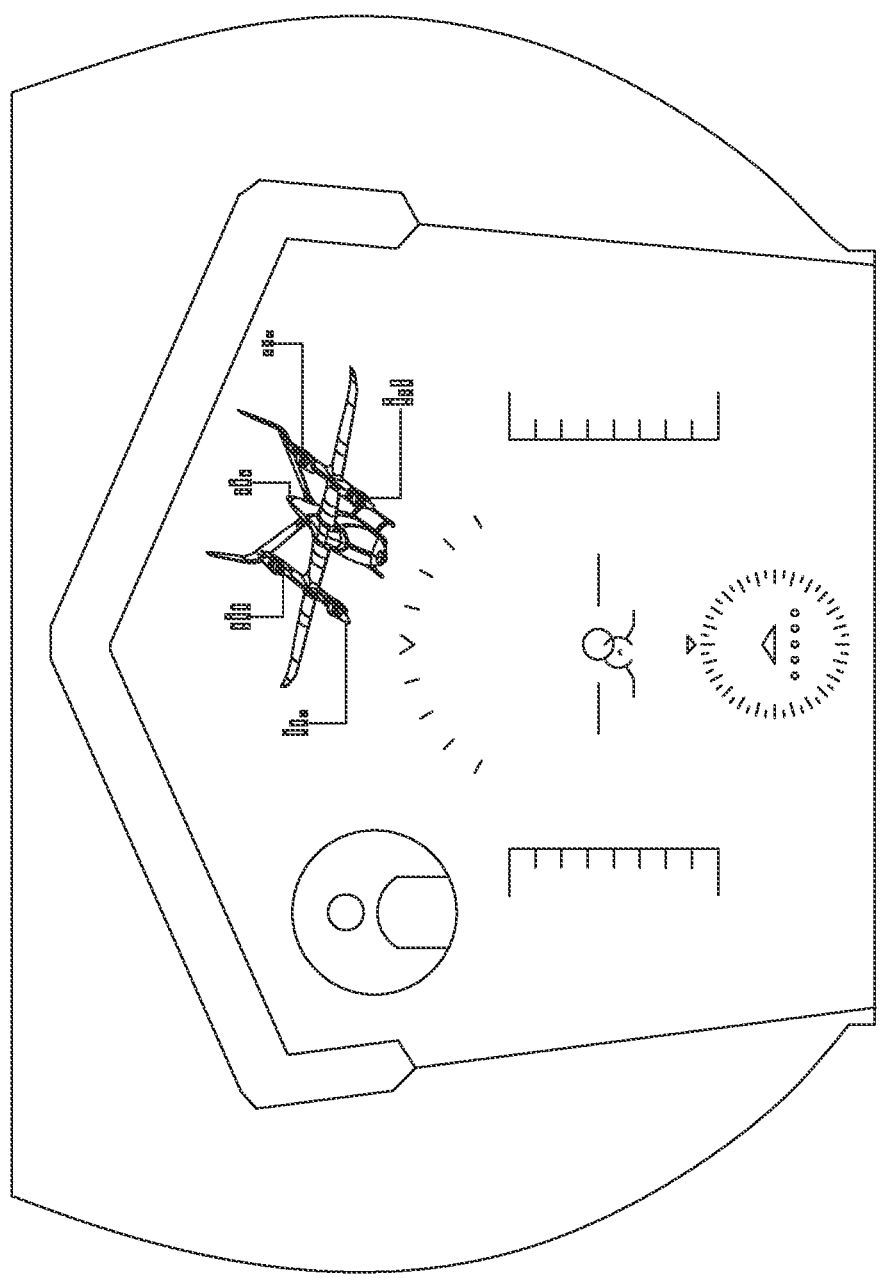
FIG. 9 is a schematic diagram of an embodiment of a display.

Now referring to FIG. 9, a diagrammatic representation of an exemplary embodiment of a display 120. Display 120 may include a separate device that includes a transparent screen configured to display 120 computer generated images and/or information. In a non-limiting embodiment, the display 1220 may be placed in front of the pilot wherein the pilot may view the information displayed. In a non-limiting embodiment, the display 120 may be placed between the pilot and the central point of the exterior view window, wherein the exterior view window is configured to provide visibility of the outside environment while the display 120 is configured to display information, wherein the information is related to the outside environment. The pilot may view the information and the outside environment with minimal bodily movement of the head of the pilot. The display 120 may include a plurality of lines, images, symbols, etc. as illustrated in FIG. 9. The lines, images, and symbols may be used to denote the current position, direction, location, state of charge etc., of the electric aircraft. The display 120 may further display information describing the electric aircraft and its functionalities in real-time. The display 120 may include alternative information related to communication. The display 120 may include one or more projection devices within the display 120 and/or screen of the display 120 to display the flight information. Persons skilled in the art, upon reviewing the entirety of this disclosure, will be aware of the various embodiments various flight information may be displayed and placed on the display 120 for purposes as described herein.

Figure 10:
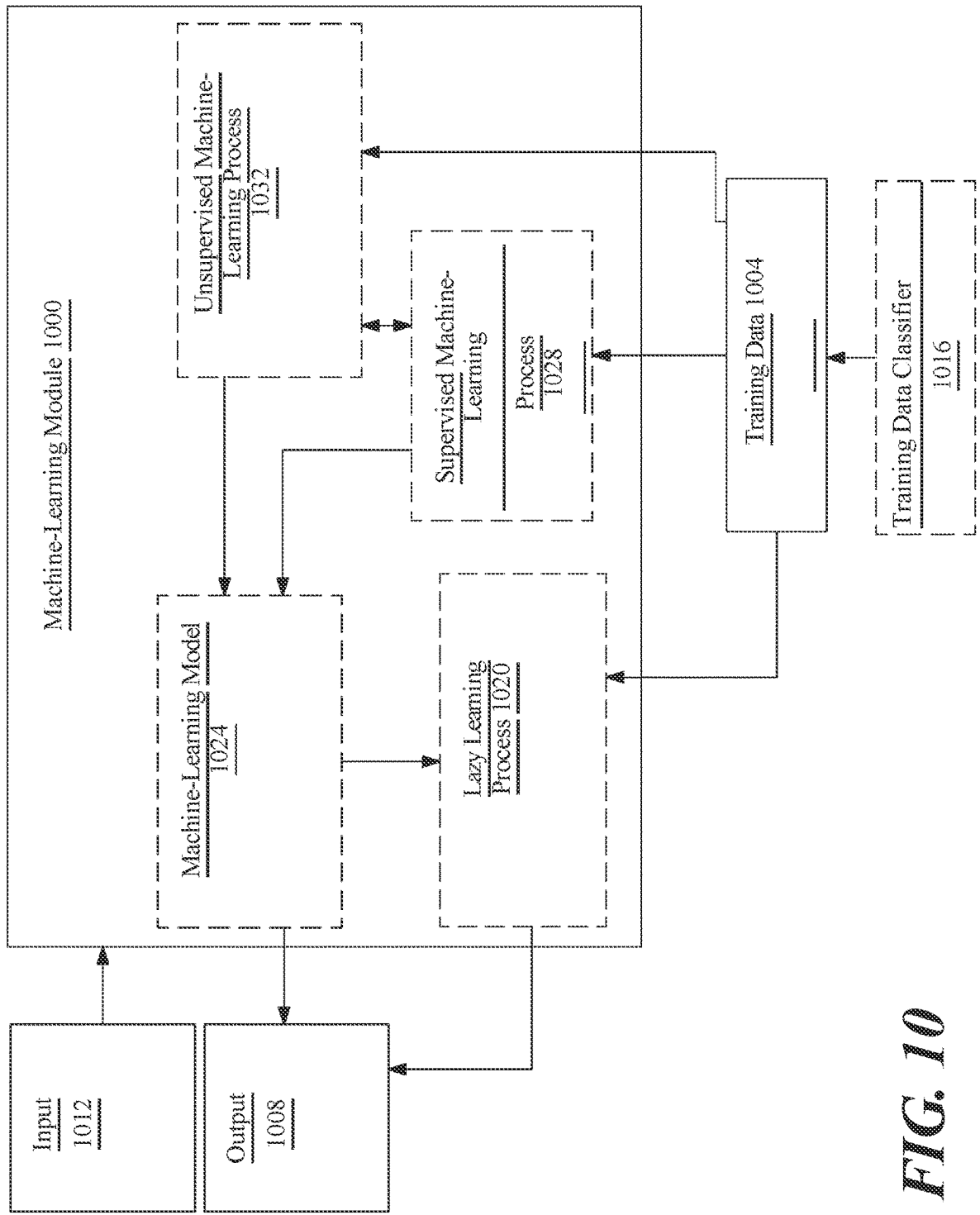
FIG. 10 is an exemplary diagram of a flight controller.

Now referring to FIG. 10, an exemplary embodiment 1000 of a flight controller 1004 is illustrated. As used in this disclosure a "flight controller" is a computing device of a plurality of computing devices dedicated to data storage, security, distribution of traffic for load balancing, and flight instruction. Flight controller 1004 may include and/or communicate with any computing device as described in this disclosure, including without limitation a microcontroller, microprocessor, digital signal processor (DSP) and/or system on a chip (SoC) as described in this disclosure. Further, flight controller 1004 may include a single computing device operating independently, or may include two or more computing device operating in concert, in parallel, sequentially or the like; two or more computing devices may be included together in a single computing device or in two or more computing devices. In embodiments, flight controller 1004 may be installed in an aircraft, may control the aircraft remotely, and/or may include an element installed in the aircraft and a remote element in communication therewith.

In an embodiment, and still referring to FIG. 10, flight controller 1004 may include a signal transformation component 1008. As used in this disclosure a "signal transformation component" is a component that transforms and/or converts a first signal to a second signal, wherein a signal may include one or more digital and/or analog signals. For example, and without limitation, signal transformation component 1008 may be configured to perform one or more operations such as preprocessing, lexical analysis, parsing, semantic analysis, and the like thereof. In an embodiment, and without limitation, signal transformation component 1008 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 1008 may include transforming one or more low-level languages such as, but not limited to, machine languages and/or assembly languages. For example, and without limitation, signal transformation component 1008 may include transforming a binary language signal to an assembly language signal. In an embodiment, and without limitation, signal transformation component 1008 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 10, signal transformation component 1008 may be configured to optimize an intermediate representation 1012. As used in this disclosure an "intermediate representation" is a data structure and/or code that represents the input signal. Signal transformation component 1008 may optimize intermediate representation as a function of a data-flow analysis, dependence analysis, alias analysis, pointer analysis, escape analysis, and the like thereof. In an embodiment, and without limitation, signal transformation component 1008 may optimize intermediate representation 1012 as a function of one or more inline expansions, dead code eliminations, constant propagation, loop transformations, and/or automatic parallelization functions. In another embodiment, signal transformation component 1008 may optimize intermediate representation as a function of a machine dependent optimization such as a peephole optimization, wherein a peephole optimization may rewrite short sequences of code into more efficient sequences of code. Signal transformation component 1008 may optimize intermediate representation to generate an output language, wherein an "output language," as used herein, is the native machine language of flight controller 1004. For example, and without limitation, native machine language may include one or more binary and/or numerical languages.

In an embodiment, and without limitation, 1008 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 10, flight controller 1004 may include a reconfigurable hardware platform 1016. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 1016 may be reconfigured to enact any algorithm and/or algorithm selection process received from another computing device and/or created using machine-learning processes.

Still referring to FIG. 10, reconfigurable hardware platform 1016 may include a logic component 1020. As used in this disclosure a "logic component" is a component that executes instructions on output language. For example, and without limitation, logic component may perform basic arithmetic, logic, controlling, input/output operations, and the like thereof. Logic component 1020 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 1020 may be organized according to Von Neumann and/or Harvard architecture as a non-limiting example. Logic component 1020 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 1020 may include one or more integrated circuit microprocessors, which may contain one or more central processing units, central processors, and/or main processors, on a single metal-oxide-semiconductor chip. Logic component 1020 may be configured to execute a sequence of stored instructions to be performed on the output language and/or intermediate representation 1012. Logic component 1020 may be configured to fetch and/or retrieve the instruction from a memory cache, wherein a "memory cache," as used in this disclosure, is a stored instruction set on flight controller 1004. Logic component 1020 may be configured to decode the instruction retrieved from the memory cache to opcodes and/or operands. Logic component 1020 may be configured to execute the instruction on intermediate representation 1012 and/or output language. For example, and without limitation, logic component 1020 may be configured to execute an addition operation on intermediate representation 1012 and/or output language.

In an embodiment, and without limitation, logic component 1020 may be configured to calculate a flight element 1024. As used in this disclosure a "flight element" is an element of datum denoting a relative status of aircraft. For example, and without limitation, flight element 1024 may denote one or more torques, thrusts, airspeed velocities, forces, altitudes, groundspeed velocities, directions during flight, directions facing, forces, orientations, and the like thereof. For example, and without limitation, flight element 1024 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 1024 may denote that aircraft is following a flight path accurately and/or sufficiently.

Still referring to FIG. 10, flight controller 1004 may include a chipset component 1028. As used in this disclosure a "chipset component" is a component that manages data flow. In an embodiment, and without limitation, chipset component 1028 may include a northbridge data flow path, wherein the northbridge dataflow path may manage data flow from logic component 1020 to a high-speed device and/or component, such as a RAM, graphics controller, and the like thereof. In another embodiment, and without limitation, chipset component 1028 may include a southbridge data flow path, wherein the southbridge dataflow path may manage data flow from logic component 1020 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 1028 may manage data flow between logic component 1020, memory cache, and a flight component 1032. As used in this disclosure a "flight component" is a portion of an aircraft that can be moved or adjusted to affect one or more flight elements. For example, flight component 1032 may include a component used to affect the aircrafts' roll and pitch which may comprise one or more ailerons. As a further example, flight component 1032 may include a rudder to control yaw of an aircraft. In an embodiment, chipset component 1028 may be configured to communicate with a plurality of flight components as a function of flight element 1024. For example, and without limitation, chipset component 1028 may transmit to an aircraft rotor to reduce torque of a first lift propulsor and increase the forward thrust produced by a pusher component to perform a flight maneuver.

In an embodiment, and still referring to FIG. 10, flight controller 1004 may be configured generate an autonomous function. As used in this disclosure an "autonomous function" is a mode and/or function of flight controller 1004 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 1024. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 1004 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 1004 will control the ailerons and/or rudders. As used in this disclosure "non-autonomous mode" is a mode that denotes a pilot will control aircraft and/or maneuvers of aircraft in its entirety.

In an embodiment, and still referring to FIG. 10, flight controller 1004 may generate autonomous function as a function of an autonomous machine-learning model. As used in this disclosure an "autonomous machine-learning model" is a machine-learning model to produce an autonomous function output given flight element 1024 and a pilot signal 1036 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 1036 may denote that a pilot is controlling and/or maneuvering ailerons, wherein the pilot is not in control of the rudders and/or propulsors. In an embodiment, pilot signal 1036 may include an implicit signal and/or an explicit signal. For example, and without limitation, pilot signal 1036 may include an explicit signal, wherein the pilot explicitly states there is a lack of control and/or desire for autonomous function. As a further non-limiting example, pilot signal 1036 may include an explicit signal directing flight controller 1004 to control and/or maintain a portion of aircraft, a portion of the flight plan, the entire aircraft, and/or the entire flight plan. As a further non-limiting example, pilot signal 1036 may include an implicit signal, wherein flight controller 1004 detects a lack of control such as by a malfunction, torque alteration, flight path deviation, and the like thereof. In an embodiment, and without limitation, pilot signal 1036 may include one or more explicit signals to reduce torque, and/or one or more implicit signals that torque may be reduced due to reduction of airspeed velocity. In an embodiment, and without limitation, pilot signal 1036 may include one or more local and/or global signals. For example, and without limitation, pilot signal 1036 may include a local signal that is transmitted by a pilot and/or crew member. As a further non-limiting example, pilot signal 1036 may include a global signal that is transmitted by air traffic control and/or one or more remote users that are in communication with the pilot of aircraft. In an embodiment, pilot signal 1036 may be received as a function of a tri-state bus and/or multiplexor that denotes an explicit pilot signal should be transmitted prior to any implicit or global pilot signal.

Still referring to FIG. 10, autonomous machine-learning model may include one or more autonomous machine-learning processes such as supervised, unsupervised, or reinforcement machine-learning processes that flight controller 1004 and/or a remote device may or may not use in the generation of autonomous function. As used in this disclosure "remote device" is an external device to flight controller 1004. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 10, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 1004 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 10, flight controller 1004 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor, and the like thereof. Remote device and/or FPGA may perform the autonomous machine-learning process using autonomous training data to generate autonomous function and transmit the output to flight controller 1004. Remote device and/or FPGA may transmit a signal, bit, datum, or parameter to flight controller 1004 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 1004 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 10, flight controller 1004 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 10, flight controller 1004 may include, but is not limited to, for example, a cluster of flight controllers in a first location and a second flight controller or cluster of flight controllers in a second location. Flight controller 1004 may include one or more flight controllers dedicated to data storage, security, distribution of traffic for load balancing, and the like. Flight controller 1004 may be configured to distribute one or more computing tasks as described below across a plurality of flight controllers, which may operate in parallel, in series, redundantly, or in any other manner used for distribution of tasks or memory between computing devices. For example, and without limitation, flight controller 1004 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 10, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 1032. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 10, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 1004. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 1012 and/or output language from logic component 1020, wherein output language may include one or more analog-to-digital conversions, low bit rate transmissions, message encryptions, digital signals, binary signals, logic signals, analog signals, and the like thereof described above in detail.

Still referring to FIG. 10, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 10, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 10, flight controller 1004 may also be implemented using a "shared nothing" architecture in which data is cached at the worker, in an embodiment, this may enable scalability of aircraft and/or computing device. Flight controller 1004 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 10, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 10, flight controller may include a sub-controller 1040. As used in this disclosure a "sub-controller" is a controller and/or component that is part of a distributed controller as described above; for instance, flight controller 1004 may be and/or include a distributed flight controller made up of one or more sub-controllers. For example, and without limitation, sub-controller 1040 may include any controllers and/or components thereof that are similar to distributed flight controller and/or flight controller as described above. Sub-controller 1040 may include any component of any flight controller as described above. Sub-controller 1040 may be implemented in any manner suitable for implementation of a flight controller as described above. As a further non-limiting example, sub-controller 1040 may include one or more processors, logic components and/or computing devices capable of receiving, processing, and/or transmitting data across the distributed flight controller as described above. As a further non-limiting example, sub-controller 1040 may include a controller that receives a signal from a first flight controller and/or first distributed flight controller component and transmits the signal to a plurality of additional sub-controllers and/or flight components.

Still referring to FIG. 10, flight controller may include a co-controller 1044. As used in this disclosure a "co-controller" is a controller and/or component that joins flight controller 1004 as components and/or nodes of a distributer flight controller as described above. For example, and without limitation, co-controller 1044 may include one or more controllers and/or components that are similar to flight controller 1004. As a further non-limiting example, co-controller 1044 may include any controller and/or component that joins flight controller 1004 to distributer flight controller. As a further non-limiting example, co-controller 1044 may include one or more processors, logic components and/or computing devices capable of receiving, processing, and/or transmitting data to and/or from flight controller 1004 to distributed flight control system. Co-controller 1044 may include any component of any flight controller as described above. Co-controller 1044 may be implemented in any manner suitable for implementation of a flight controller as described above.

In an embodiment, and with continued reference to FIG. 10, flight controller 1004 may be designed and/or configured to perform any method, method step, or sequence of method steps in any embodiment described in this disclosure, in any order and with any degree of repetition. For instance, flight controller 1004 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 11:
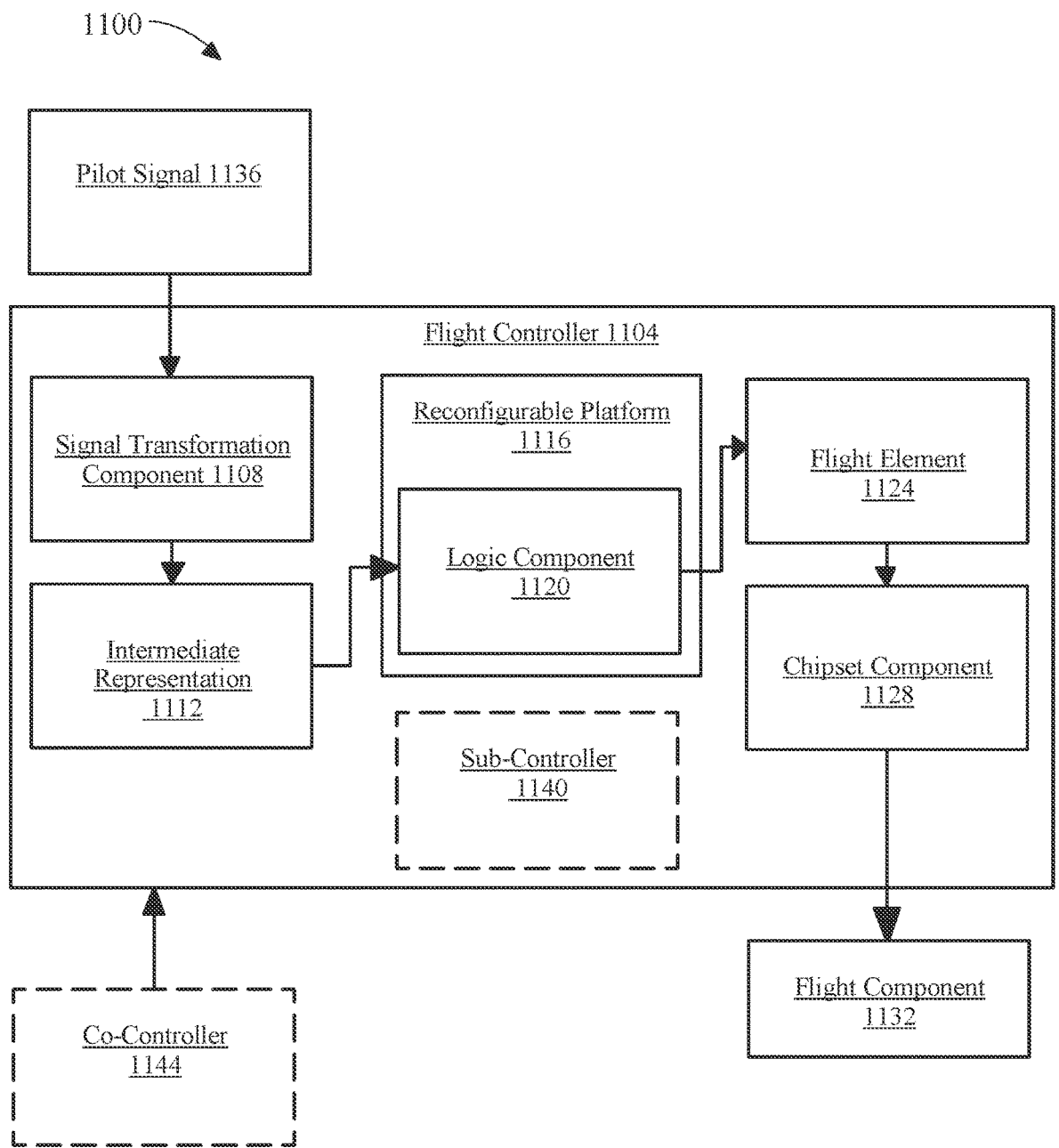
FIG. 11 is an illustrative diagram of a machine learning model.

Referring now to FIG. 11, an exemplary embodiment of a machine-learning module 1100 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1104 to generate an algorithm that will be performed by a computing device/module to produce outputs 1108 given data provided as inputs 1112; this is in contrast to a non-machine learning software program where the commands to be executed are determined in advance by a user and written in a programming language.

Still referring to FIG. 11, "training data," as used herein, is data containing correlations that a machine-learning process may use to model relationships between two or more categories of data elements. For instance, and without limitation, training data 1104 may include a plurality of data entries, each entry representing a set of data elements that were recorded, received, and/or generated together; data elements may be correlated by shared existence in a given data entry, by proximity in a given data entry, or the like. Multiple data entries in training data 1104 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1104 according to various correlations; correlations may indicate causative and/or predictive links between categories of data elements, which may be modeled as relationships such as mathematical relationships by machine-learning processes as described in further detail below. Training data 1104 may be formatted and/or organized by categories of data elements, for instance by associating data elements with one or more descriptors corresponding to categories of data elements. As a non-limiting example, training data 1104 may include data entered in standardized forms by persons or processes, such that entry of a given data element in a given field in a form may be mapped to one or more descriptors of categories. Elements in training data 1104 may be linked to descriptors of categories by tags, tokens, or other data elements; for instance, and without limitation, training data 1104 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 11, training data 1104 may include one or more elements that are not categorized; that is, training data 1104 may not be formatted or contain descriptors for some elements of data. Machine-learning algorithms and/or other processes may sort training data 1104 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1104 to be made applicable for two or more distinct machine-learning algorithms as described in further detail below. Training data 1104 used by machine-learning module 1100 may correlate any input data as described in this disclosure to any output data as described in this disclosure. As a non-limiting illustrative example flight elements and/or pilot signals may be inputs, wherein an output may be an autonomous function.

Further referring to FIG. 11, training data may be filtered, sorted, and/or selected using one or more supervised and/or unsupervised machine-learning processes and/or models as described in further detail below; such models may include without limitation a training data classifier 1116. Training data classifier 1116 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1100 may generate a classifier using a classification algorithm, defined as a processes whereby a computing device and/or any module and/or component operating thereon derives a classifier from training data 1104 Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 11, machine-learning module 1100 may be configured to perform a lazy-learning process 1120 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1104. Heuristic may include selecting some number of highest-ranking associations and/or training data 1104 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 11, machine-learning processes as described in this disclosure may be used to generate machine-learning models 1124. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 1124 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1124 may be generated by creating an artificial neural network, such as a convolutional neural network comprising an input layer of nodes, one or more intermediate layers, and an output layer of nodes. Connections between nodes may be created via the process of "training" the network, in which elements from a training data 1104 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 11, machine-learning algorithms may include at least a supervised machine-learning process 1128. At least a supervised machine-learning process 1128, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1104. Persons skilled in the art, upon reviewing the entirety of this disclosure, will be aware of various possible variations of at least a supervised machine-learning process 1128 that may be used to determine relation between inputs and outputs. Supervised machine-learning processes may include classification algorithms as defined above.

Further referring to FIG. 11, machine learning processes may include at least an unsupervised machine-learning processes 1132. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 11, machine-learning module 1100 may be designed and configured to create a machine-learning model 1124 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 11, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 12:
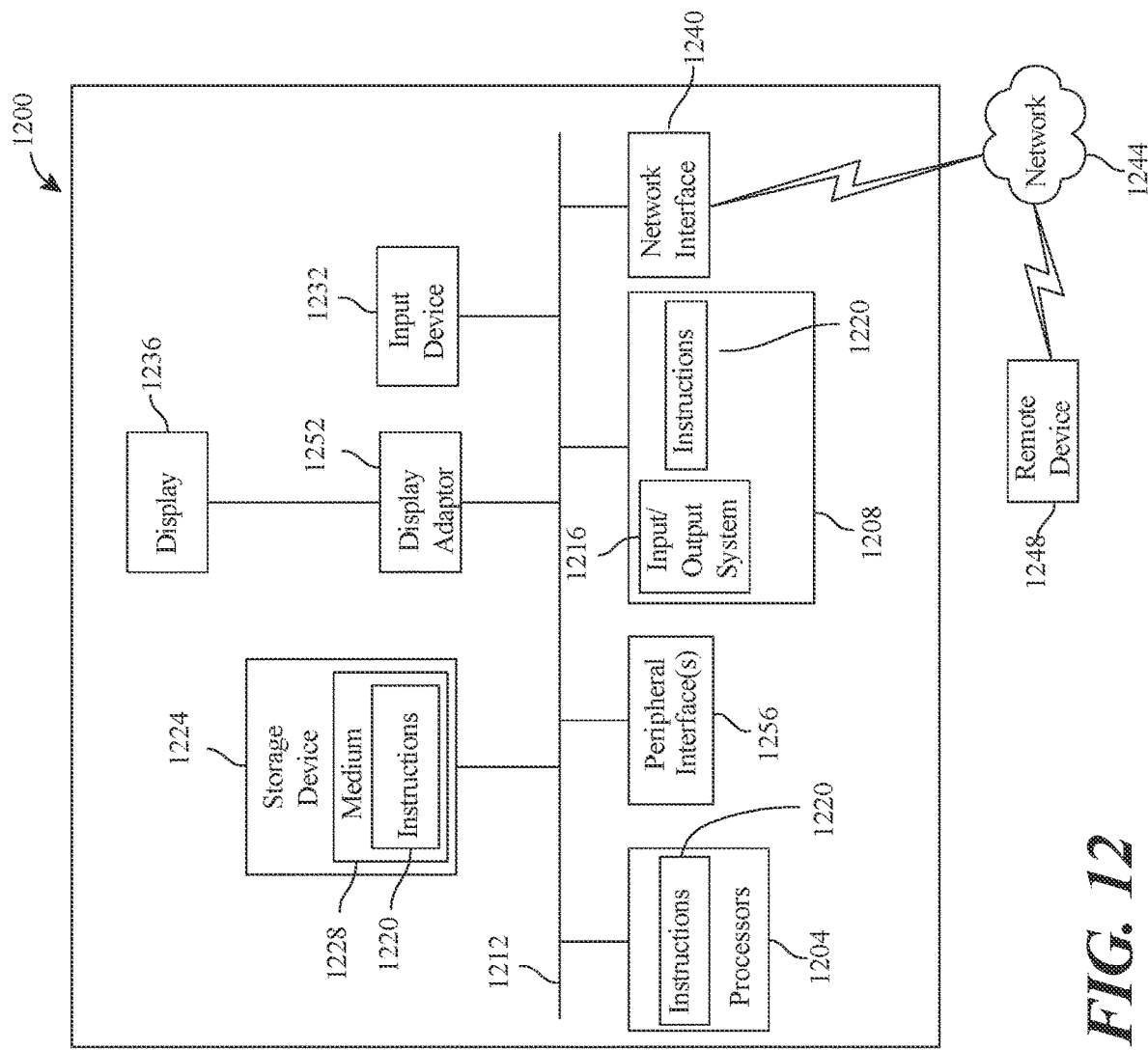
FIG. 12 is a block diagram of a computing system that can be used to implement any one or more of the methodologies disclosed herein and any one or more portions thereof.

FIG. 12 shows a diagrammatic representation of one embodiment of a computing device in the exemplary form of a computer system 1200 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1200 includes a processor 1204 and a memory 1208 that communicate with each other, and with other components, via a bus 1212. Bus 1212 may include any of several types of bus structures including, but not limited to, a memory bus, a memory controller, a peripheral bus, a local bus, and any combinations thereof, using any of a variety of bus architectures.

Processor 1204 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1204 may be organized according to Von Neumann and/or Harvard architecture as a non-limiting example. Processor 1204 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1208 may include various components (e.g., machine-readable media) including, but not limited to, a random-access memory component, a read only component, and any combinations thereof. In one example, a basic input/output system 1216 (BIOS), including basic routines that help to transfer information between elements within computer system 1200, such as during start-up, may be stored in memory 1208. Memory 1208 may also include (e.g., stored on one or more machine-readable media) instructions (e.g., software) 1220 embodying any one or more of the aspects and/or methodologies of the present disclosure. In another example, memory 1208 may further include any number of program modules including, but not limited to, an operating system, one or more application programs, other program modules, program data, and any combinations thereof.

Computer system 1200 may also include a storage device 1224. Examples of a storage device (e.g., storage device 1224) include, but are not limited to, a hard disk drive, a magnetic disk drive, an optical disc drive in combination with an optical medium, a solid-state memory device, and any combinations thereof. Storage device 1224 may be connected to bus 1212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1224 (or one or more components thereof) may be removably interfaced with computer system 1200 (e.g., via an external port connector (not shown)). Particularly, storage device 1224 and an associated machine-readable medium 1228 may provide nonvolatile and/or volatile storage of machine-readable instructions, data structures, program modules, and/or other data for computer system 1200. In one example, software 1220 may reside, completely or partially, within machine-readable medium 1228. In another example, software 1220 may reside, completely or partially, within processor 1204.

Computer system 1200 may also include an input device 1232. In one example, a user of computer system 1200 may enter commands and/or other information into computer system 1200 via input device 1232. Examples of an input device 1232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1232 may be interfaced to bus 1212 via any of a variety of interfaces (not shown) including, but not limited to, a serial interface, a parallel interface, a game port, a USB interface, a FIREWIRE interface, a direct interface to bus 1212, and any combinations thereof. Input device 1232 may include a touch screen interface that may be a part of or separate from display 1236, discussed further below. Input device 1232 may be utilized as a user selection device for selecting one or more graphical representations in a graphical interface as described above.

A user may also input commands and/or other information to computer system 1200 via storage device 1224 (e.g., a removable disk drive, a flash drive, etc.) and/or network interface device 1240. A network interface device, such as network interface device 1240, may be utilized for connecting computer system 1200 to one or more of a variety of networks, such as network 1244, and one or more remote devices 1248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1244, may employ a wired and/or a wireless mode of communication. In general, any network topology may be used. Information (e.g., data, software 1220, etc.) may be communicated to and/or from computer system 1200 via network interface device 1240.

Computer system 1200 may further include a video display adapter 1252 for communicating a displayable image to a display device, such as display device 1236. Examples of a display device include, but are not limited to, a liquid crystal display (LCD), a cathode ray tube (CRT), a plasma display, a light emitting diode (LED) display, and any combinations thereof. Display adapter 1252 and display device 1236 may be utilized in combination with processor 1204 to provide graphical representations of aspects of the present disclosure. In addition to a display device, computer system 1200 may include one or more other peripheral output devices including, but not limited to, an audio speaker, a printer, and any combinations thereof. Such peripheral output devices may be connected to bus 1212 via a peripheral interface 1256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A method comprising:
   determining, by a controller, a power-production capability of at least one energy source based at least in part on at least one electrical parameter;
   calculating, by the controller, at least a projected power-consumption need of an electric aircraft;
   comparing, by the controller, the power-production capability of the at least one energy source to the projected power-consumption need; and
   displaying at least an element of the power-production capability compared to the projected power-consumption need.

2. The method of claim 1, wherein determining the power-production capability includes determining a state of charge (SOC) of the at least one energy source and modifying an SOC curve as a function of the at least one electrical parameter.

3. The method of claim 1, wherein determining the projected power-consumption need includes determining an energy cost associated with performing one or more maneuvers associated with a flight plan.

4. The method of claim 3, wherein the one or more maneuvers include at least one of a landing according to a landing protocol or traveling a distance while cruising.

5. The method of claim 1, wherein determining the projected power-consumption need includes determining at least one condition of flight including at least one of a speed of wind, a direction of wind, air density, degree of turbulence, or exterior temperature.

6. The method of claim 1, wherein the element of the power-production capability includes an indication of a remaining time able to use rotor-based flight based on the at least one energy source.

7. The method of claim 1, wherein the at least one electrical parameter includes torque datum and the element includes indication of a torque value require for power-production capability.

8. A computing device comprising:
   one or more processors; and
   one or more non-transitory computer readable media storing computer executable instructions that, when executed, cause the one or more processors to perform operations comprising:
   determining, by a controller, a power-production capability of at least one energy source based at least in part on at least one electrical parameter;
   calculating, by the controller, at least a projected power-consumption need of an electric aircraft;
   comparing, by the controller, the power-production capability of the at least one energy source to the projected power-consumption need; and
   displaying at least an element of the power-production capability compared to the projected power-consumption need.

9. The computing device of claim 8, wherein determining the power-production capability includes determining a state of charge (SOC) of the at least one energy source and modifying an SOC curve as a function of the at least one electrical parameter.

10. The computing device of claim 8, wherein determining the projected power-consumption need includes determining an energy cost associated with performing one or more maneuvers associated with a flight plan.

11. The computing device of claim 10, wherein the one or more maneuvers include at least one of a landing according to a landing protocol or traveling a distance while cruising.

12. The computing device of claim 8, wherein determining the projected power-consumption need includes determining at least one condition of flight including at least one of a speed of wind, a direction of wind, air density, degree of turbulence, or exterior temperature.

13. The computing device of claim 8, wherein the element of the power-production capability includes an indication of a remaining time able to use rotor-based flight based on the at least one energy source.

14. The computing device of claim 8, wherein the at least one electrical parameter includes torque datum and the element includes indication of a torque value require for power-production capability.

15. An arial vehicle comprising:
   a processor; and
   memory storing computer readable instructions causing the processor to perform one or more operations including:
   determining, by a controller, a power-production capability of at least one energy source based at least in part on at least one electrical parameter;
   calculating, by the controller, at least a projected power-consumption need of an electric aircraft;
   comparing, by the controller, the power-production capability of the at least one energy source to the projected power-consumption need; and
   displaying at least an element of the power-production capability compared to the projected power-consumption need.

16. The arial vehicle of claim 15, wherein determining the power-production capability includes determining a state of charge (SOC) of the at least one energy source and modifying an SOC curve as a function of the at least one electrical parameter.

17. The arial vehicle of claim 15, wherein determining the projected power-consumption need includes determining an energy cost associated with performing one or more maneuvers associated with a flight plan.

18. The arial vehicle of claim 17, wherein the one or more maneuvers include at least one of a landing according to a landing protocol or traveling a distance while cruising.

19. The arial vehicle of claim 15, wherein determining the projected power-consumption need includes determining at least one condition of flight including at least one of a speed of wind, a direction of wind, air density, degree of turbulence, or exterior temperature.

20. The arial vehicle of claim 15, wherein the element of the power-production capability includes an indication of a remaining time able to use rotor-based flight based on the at least one energy source.

\* \* \* \* \*